United States Patent
Itoh et al.

(10) Patent No.: US 6,361,579 B1
(45) Date of Patent: Mar. 26, 2002

(54) EXHAUST GAS PURIFIER AND METHOD FOR INTERNAL COMBUSTION ENGINE

(75) Inventors: Kazuhiro Itoh, Mishima; Toshiaki Tanaka, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/599,324

(22) Filed: Jun. 22, 2000

(30) Foreign Application Priority Data

Jun. 23, 1999 (JP) ............................................ 11-177011

(51) Int. Cl.[7] .............................. B01D 29/62; F01N 3/10
(52) U.S. Cl. ............... 55/523; 55/DIG. 10; 55/DIG. 30; 422/171; 422/174; 422/177; 422/178
(58) Field of Search ........................... 55/523, DIG. 10, 55/DIG. 30; 60/295, 311; 422/174, 171, 177, 178; 502/64; 44/300; 423/213.5, 230

(56) References Cited

U.S. PATENT DOCUMENTS

| | | | |
|---|---|---|---|
| 3,966,443 A | | 6/1976 | Okano et al. |
| 4,233,276 A | * | 11/1980 | D'Souza et al. ............. 423/230 |
| 5,682,740 A | * | 11/1997 | Kawamura ................... 55/523 |
| 5,820,833 A | * | 10/1998 | Kawamura ................... 55/523 |
| 5,853,459 A | * | 12/1998 | Kuwamoto et al. ........... 55/523 |
| 5,990,030 A | * | 11/1999 | McCauley ................... 502/64 |
| 6,200,358 B1 | * | 3/2001 | FLeischer et al. ............ 44/300 |
| 6,214,307 B1 | * | 4/2001 | Okumura et al. ......... 423/213.5 |

FOREIGN PATENT DOCUMENTS

| | | | | |
|---|---|---|---|---|
| DE | 2810937 | * | 9/1979 | .................. 55/523 |
| EP | 0105113 | | 4/1984 | |
| EP | 0154145 | | 9/1985 | |
| EP | 0341832 | | 11/1989 | |
| FR | 2650628 | | 2/1991 | |
| JP | 02261511 | | 10/1990 | |
| JP | 403270706 A | * | 12/1991 | .................. 55/523 |
| JP | 6-159037 | | 6/1994 | |
| JP | 06272541 | | 9/1994 | |
| JP | 9-271674 | | 10/1997 | |

* cited by examiner

Primary Examiner—David A. Simmons
Assistant Examiner—Minh-chau T. Pham
(74) Attorney, Agent, or Firm—Kenyon & Kenyon

(57) ABSTRACT

In an exhaust gas purifier for an internal combustion engine having a trap for trapping particulate matters contained in exhaust gas discharged from the internal combustion engine, the present invention aims at suppressing production of ashes and thereby preventing pressure loss associated with the clogging of the trap. In order to achieve this object, the present invention provides an exhaust gas purifier for an internal combustion engine having a trap for trapping particulate matters contained in exhaust gas discharged from the internal combustion engine, wherein the trap carries a metal which has an electronegativity equal to or lower than a predetermined content contained in fuel or lubricating oil for the internal combustion engine.

4 Claims, 3 Drawing Sheets

EXHAUST GAS PURIFIER AND METHOD FOR INTERNAL COMBUSTION ENGINE

BACKGROUND OF THE INVENTION

The present invention relates to an exhaust gas purification technology for removing particulate matters from exhaust gas discharged from an internal combustion engine.

It is demanded of an internal combustion engine installed in a motor vehicle or the like to improve exhaust emission properties by purifying noxious gas contents contained in exhaust gas such as nitrogen oxides ($NO_x$) and hydrocarbon (HC). Especially in the case of a diesel engine, it is also important to reduce so-called particulate matters (PM) such as soot and SOF (soluble organic fractions) as well as nitrogen oxides ($NO_x$) and hydrocarbon (HC).

To meet such a demand, "an exhaust gas purifier for an internal combustion engine" as disclosed in Japanese Patent Gazette No. 2722987 has been proposed.

The exhaust gas purifier for the internal combustion engine disclosed in the above-mentioned publication is constructed as follows. A particulate filter for trapping particulate matters in exhaust gas is provided in an exhaust passage of the internal combustion engine. An $NO_x$ absorbent, which absorbs $NO_x$ in exhaust gas when the exhaust gas demonstrates a lean air-fuel ratio and which discharges and reduces the absorbed $NO_x$ when the exhaust gas demonstrates a low concentration of oxygen and there is a reducing agent, is disposed at such a location that heat transfer to the particulate filter is possible. The exhaust gas purifier for the internal combustion engine thus constructed is intended to burn and remove particulate matters trapped in the particulate filter by raising a temperature of the particulate filter with the aid of heat generated at the time of an oxidizing reaction of the reducing agent on the $NO_x$ absorbent.

By the way, agglomeration of compounds called ashes may clog exhaust flow passages in the particulate filter and increase pressure loss in exhaust gas.

The mechanism of production of ashes has not been unriddled yet but is hypothesized as follows.

That is, fuel or lubricating oil for the internal combustion engine (so-called engine oil) contains various additives and impurities. These contents bond to one another in combustion chambers of the internal combustion engine or on the particulate filter, thus forming various compounds. These compounds agglomerate on the particulate filter and form ashes.

For example, fuel or lubricating oil for the internal combustion engine contains sulfur (S) contents, phosphorus (P) contents, calcium (Ca), magnesium (Mg) and the like. The contents contained in blow-by gas (lubricating oil) bond to the contents contained in mixture (fuel), whereby compounds such as calcium sulfate ($CaSO_4$), calcium phosphate ($Ca_3(SO_4)_2$) and magnesium sulfate ($MgSO_4$) are produced. The calcium sulfate ($CaSO_4$), calcium phosphate ($Ca_3(SO_4)_2$) and magnesium sulfate ($MgSO_4$) are trapped onto the particulate filter together with particulate matters (PM) and are agglomerated as ashes.

Because sulfur (S) has a property of high absorbency into soot, the sulfur (S) that has been absorbed onto the particulate filter together with soot bonds to calcium (Ca) and magnesium (Mg) in exhaust gas and thus produces compounds such as calcium sulfate ($CaSO_4$) and magnesium sulfate ($MgSO_4$). These compounds are agglomerated as ashes.

If ashes are produced in the particulate filter in this manner, the exhaust gas in the particulate filter is clogged to such an extent that pressure loss in exhaust gas increases. Therefore, it is important to suppress the production of ashes in the particulate filter.

SUMMARY OF THE INVENTION

The present invention has been made in view of the aforementioned circumstances. In an exhaust gas purifier having a trap for trapping particulate matters contained in exhaust gas discharged from an internal combustion engine, the present invention aims at preventing pressure loss in exhaust gas associated with the clogging of the trap by providing a technology which makes it possible to suppress the production of ashes.

The present invention has adopted the following measures in order to achieve the above-mentioned object. That is, the present invention provides an exhaust gas purifier for an internal combustion engine having a trap for trapping particulate matters contained in exhaust gas discharged from the internal combustion engine, and wherein the trap is constructed to carry a metal which has an electronegativity equal to or lower than a predetermined content contained in fuel or lubricating oil for the internal combustion engine.

Also, according to the present invention, an exhaust gas purifying method for an internal combustion engine comprising the steps of: carrying a metal which has an electronegativity equal to or lower than a predetermined content contained in fuel or lubricating oil for the internal combustion engine in a trap for trapping particulate matters contained in exhaust gas discharged from the internal combustion engine; and suppressing condensation of a sulfur content discharged from the internal combustion engine and the predetermined content on the trap.

In the exhaust gas purifier thus constructed, the trap traps the particulate matters contained in exhaust gas discharged from the internal combustion engine.

In this process, the exhaust gas contains contents which are originally contained in fuel and/or lubricating oil for the internal combustion engine. A predetermined one of those contents may bond to other contents (hereinafter referred to as bonded contents) on the trap and may produce ashes.

However, the trap carries a metal which has an electronegativity equal to or lower than the predetermined content, preferably a metal which has an electronegativity lower than the predetermined content and which has an ionization tendency greater than the predetermined content. In other words, the trap carries a metal which bonds to the bonded contents with a greater bonding strength than the predetermined content.

Thus, the bonded contents bond to the metal carried on the trap instead of bonding to the predetermined content. As a result, production of ashes in the trap is suppressed.

Compounds of the metal carried on the trap and the bonded contents may be agglomerated on the trap as is the case with ashes. It is preferable to select the metal such that those compounds are decomposed or purified under a condition similar to the condition for purification of particulate matters.

Thus, the exhaust gas purifier for the internal combustion engine in accordance with the present invention makes it possible to suppress formation of ashes in the trap, prevent the clogging of the trap associated with ashes, and obviate pressure loss in exhaust gas.

DESCRIPTION OF PREFERRED EMBODIMENT OF THE INVENTION

An exhaust gas purifier for an internal combustion engine in accordance with the present invention will be described hereinafter with reference to the drawings. Here, the description will be made as to an aspect wherein the exhaust gas purifier in accordance with the present invention is applied to a vehicular diesel engine.

Figure 1:
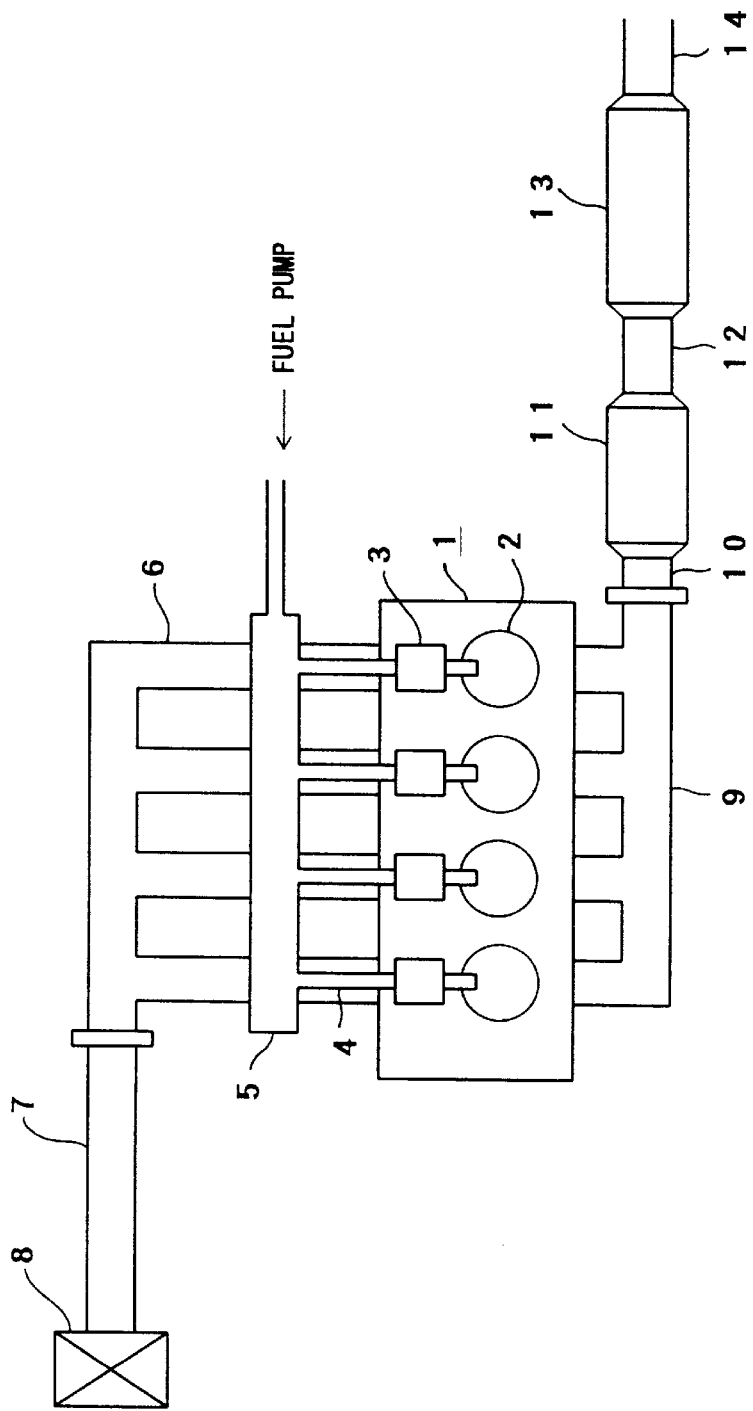
FIG. 1 schematically shows the structure of an internal combustion engine to which an exhaust gas purifier in accordance with the present invention is applied.

FIG. 1 schematically shows the structure of an internal combustion engine to which the present invention is applied.

The internal combustion engine 1 is a water-cooled diesel engine having four cylinders 2. In the internal combustion engine 1, the cylinders 2 are respectively fitted with fuel injection valves 3 for directly injecting fuel into combustion chambers (not shown).

The fuel injection valves 3 communicate with an accumulator (a common rail) 5 through fuel distribution pipes 4. The common rail 5 is connected to a fuel pump (not shown).

In the fuel injection system thus constructed, fuel discharged from the fuel pump is supplied to the common rail 5. This fuel is accumulated in the common rail 5 until it reaches a predetermined pressure. The fuel accumulated in the common rail 5 is fed to the fuel injection valves 3 through the fuel distribution pipes 4. Upon the opening of the fuel injection valves 3, the accumulated fuel is injected into the combustion chambers of the respective cylinders 2.

An intake manifold 6 equipped with a plurality of branch pipes is connected to the internal combustion engine 1. The branch pipes of the intake manifold 6 respectively communicate with the combustion chambers of the cylinders 2. The intake manifold 6 is connected to an intake pipe 7, which is connected to an air cleaner box 8 containing an air filter.

In the intake system thus constructed, fresh air that has flown into the air cleaner box 8 is removed of dust or dirt by the air filter and then introduced into the intake manifold 6 through the intake pipe 7. The fresh air introduced into the intake manifold 6 is respectively distributed to the combustion chambers of the cylinders 2 through the branch pipes and then burnt by using fuel injected from the fuel injection valves 3 as an ignition source.

An exhaust manifold 9 formed of a single pipe to which a plurality of branch pipes converge is connected to the internal combustion engine 1. The branch pipes of the exhaust manifold 9 respectively communicate with the combustion chambers of the cylinders 2 through exhaust ports (not shown).

The exhaust manifold 9 is connected to a first exhaust pipe 10, which is connected to a particulate filter 11 designed as a trap in accordance with the present invention. The particulate filter 11 is connected to a second exhaust pipe 12, which is connected to an exhaust gas purification catalyst 13. Further, the exhaust gas purification catalyst 13 is connected to a third exhaust pipe 14. The third exhaust pipe 14 is connected downstream thereof to a muffler (not shown).

As an example of the above-mentioned exhaust gas purification catalyst 13, an oxidation catalyst, a selective reduction type $NO_x$ catalyst, an occlusion reduction type $NO_x$ catalyst or the like can be used.

The particulate filter 11 is constructed of a carrier made of a porous ceramic material. This carrier is a wall-through type trap constructed of first and second flow passages which are disposed alternately and in a honeycomb manner. Each of the first flow passages has an open upstream end and a closed downstream end. Each of the second flow passages has a closed upstream end and an open downstream end.

In the particulate filter 11, exhaust gas from the first exhaust pipe 10 flows into the first flow passages. The exhaust gas that has flown into the first flow passages flows into the second flow passages through pores in porous ceramic wall surfaces of the first flow passages, and then is discharged from the second flow passages into the second exhaust pipe 12.

When exhaust gas flows through the pores in the porous ceramic wall surfaces, so-called particulate matters (PM) such as soot and SOF (soluble organic fractions) in the exhaust gas are trapped.

The particulate matters (PM) trapped in the particulate filter 11 are burnt or removed when exhaust gas flowing into the particulate filter 11 has a lean air-fuel ratio and a high temperature (e.g. 500 C. to 700 C.).

Light oil used as fuel for the internal combustion engine 1 contains more sulfur (S) contents than gasoline. Lubricating oil (engine oil) for the internal combustion engine 1 contains calcium (Ca).

Because lubricating oil for the internal combustion engine 1 may enter the combustion chambers as blow-by gas, it is possible that the above-mentioned exhaust gas containing sulfur (S) contents and calcium (Ca) flow into the particulate filter 11.

Figure 2:
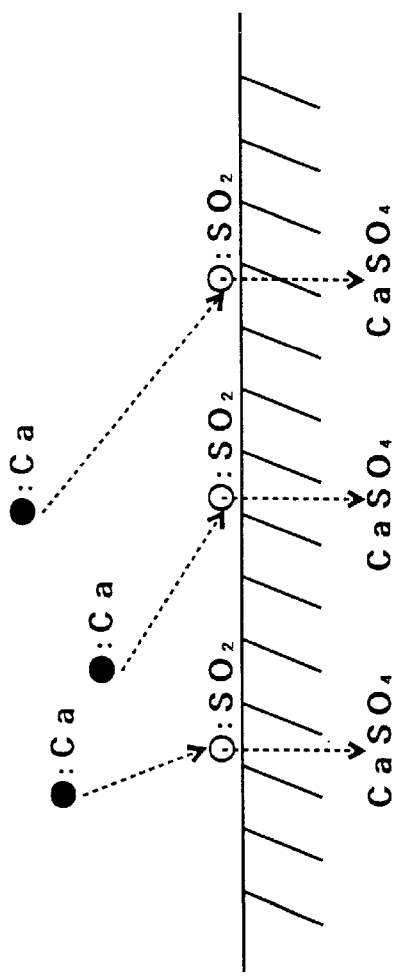
FIG. 2 explains a mechanism for generating ashes in a particulate filter.

Because sulfur (S) contents have a property of high absorbency into soot, the sulfur (S) contents in exhaust gas are trapped in the particulate filter 11 together with soot. As shown in FIG. 2, the sulfur (S) contents trapped in the particulate filter 11 bond to the calcium (Ca) in exhaust gas and produce calcium sulfate ($CaSO_4$).

It is possible that the calcium sulfate ($CaSO_4$) thus produced be trapped in the particulate filter 11, agglomerate, grow into particulate matters, form ashes, and occlude the pores in the particulate filter 11.

Hence, according to this embodiment, a metal that has an electronegativity equal to or lower than calcium (Ca) contributing to the production of ashes and that has an ionization tendency greater than calcium (Ca) is carried on the carrier of the particulate filter 11.

As an example of the metal, lithium (Li), sodium (Na), potassium (K), rubidium (Rb), cesium (Cs), strontium (Sr), barium (Ba) or the like can be used. The following description will be made as to an example in which potassium (K) is used.

Figure 3:
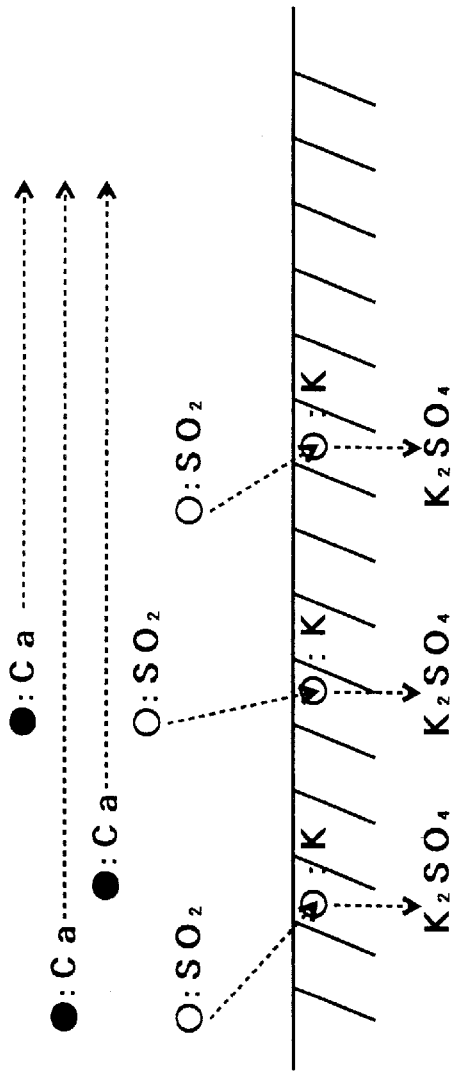
FIG. 3 explains a mechanism for suppressing generation of ashes in a particulate filter.

According to the particulate filter 11 thus constructed, if exhaust gas containing calcium (Ca) and sulfur (S) contents flows into the particulate filter 11, priority is given to the bonding of potassium (K) to sulfur (S) contents rather than to the bonding of calcium (Ca) to sulfur (S) contents on the particulate filter 11, as can be seen from FIG. 3. The production of calcium sulfate ($CaSO_4$) forming ashes is suppressed.

Thus, in the exhaust gas purifier for the internal combustion engine in accordance with this embodiment, a metal that has an electronegativity lower than calcium (Ca) and that has an ionization tendency greater than calcium (Ca) is carried on the particulate filter 11, whereby formation of ashes is suppressed and the clogging of the particulate filter 11 is prevented. As a result, it becomes possible to prevent pressure loss in exhaust gas.

Further, potassium sulfate ($K_2SO_4$), which is formed instead of ashes on the particulate filter 11, has a lower degree of agglomeration than calcium sulfate ($CaSO_4$). Thus, it is possible to easily decompose or remove potassium sulfate ($K_2SO_4$) by heating atmosphere around the particulate filter 11 to a high temperature or exposing the particulate filter 11 to reduction atmosphere.

That is, potassium sulfate ($K_2SO_4$) formed on the particulate filter 11 can be decomposed or removed together with particulate matters (PM) when the temperature of atmosphere around the particulate filter 11 is raised to burn the particulate matters (PM) trapped in the particulate filter 11.

In this embodiment, the description has been made as to an example in which a diesel engine is used as an internal combustion engine to which the exhaust gas purifier in accordance with the present invention is applied. However, it goes without saying that a gasoline engine can also be used.

In the case of a gasoline engine, fuel contains less sulfur (S) contents and more phosphorus (P) contents in comparison with the case of a diesel engine. Thus, on the particulate filter, calcium (Ca) bonds to phosphorus (P) contents and produces calcium phosphate ($Ca_3(SO_4)_2$), which agglomerates, grows into particulate matters and forms ashes.

As a countermeasure against this, a metal (e.g. potassium (K)) that has an electronegativity equal to or lower than calcium (Ca) and that has an ionization tendency greater than calcium (Ca) is carried on the carrier of the particulate filter, whereby priority is given to the bonding of potassium (K) to phosphorus (P) contents rather than to the bonding of calcium (Ca) to phosphorus (P) contents on the particulate filter. As a result, the production of calcium phosphate ($Ca_3(SO_4)_2$) forming ashes is suppressed.

What is claimed is:

1. An exhaust gas purifier for an internal combustion engine comprising:

a trap for trapping particulate matters contained in exhaust gas discharged from the internal combustion engine, and wherein the trap is constructed to carry a metal which has an electronegativity equal to or lower than calcium (Ca) contained in fuel or lubricating oil for the internal combustion engine.

2. The exhaust gas purifier according to claim 1, wherein:

the metal has an electronegativity equal to or lower than calcium (Ca) and an ionization tendency greater than calcium (Ca).

3. The exhaust gas purifier according to claim 1, wherein:

the metal is at least selected from lithium (Li), sodium (Na), potassium (K), rubidium (Rb), cesium (Cs), strontium (Sr) and barium (Ba).

4. An exhaust gas purifying method for an internal combustion engine comprising the steps of:

carrying a metal which has an electronegativity equal to or lower than calcium (Ca) contained in fuel or lubricating oil for the internal combustion engine in a trap for trapping particulate matters contained in exhaust gas discharged from the internal combustion engine; and suppressing condensation of a sulfur content discharged from the internal combustion engine and the production of ashes on the trap.

* * * * *